United States Patent
Vodermayer et al.

(10) Patent No.: US 6,372,294 B1
(45) Date of Patent: *Apr. 16, 2002

(54) MANUFACTURE OF UNIDIRECTIONAL FIBER REINFORCED THERMOPLASTICS

(75) Inventors: Albert Maria Vodermayer, Dietlikon; Jens Kärger, Winterthur; Stefan Kaufmann, Lenzburg; Hans Erlach, Winterthur, all of (CH)

(73) Assignee: Sulzer Innotec AG, Winterthur (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/252,844

(22) Filed: Feb. 19, 1999

(30) Foreign Application Priority Data

Feb. 20, 1998 (EP) .............................. 98810139

(51) Int. Cl.⁷ .............................. B05D 3/12; B05D 1/18; B05D 3/02
(52) U.S. Cl. ................... 427/355; 427/359; 427/385.5; 427/434.2; 427/434.4; 427/434.6; 156/166; 156/296
(58) Field of Search ................... 427/359, 355, 427/385.5, 434.4, 434.6, 434.2; 156/166, 180, 296

(56) References Cited

U.S. PATENT DOCUMENTS

| | | | |
|---|---|---|---|
| 3,940,464 A | * | 2/1976 | Davis et al. ................... 264/40 |
| 3,947,611 A | * | 3/1976 | White ......................... 427/177 |
| 4,728,387 A | | 3/1988 | Hilakos |
| 4,828,776 A | * | 5/1989 | Morel et al. ................. 264/136 |
| 5,336,526 A | * | 8/1994 | Spoo et al. ............... 427/372.2 |
| 5,725,710 A | * | 3/1998 | Pfeiffer et al. ............... 156/180 |
| 5,888,580 A | * | 3/1999 | Hinrichsen et al. ............ 427/8 |

FOREIGN PATENT DOCUMENTS

| | | |
|---|---|---|
| DE | 4121915 A1 | 1/1993 |
| EP | 0122173 A1 | 10/1984 |
| EP | 0637502 A1 | 2/1995 |
| GB | 2086444 A | 5/1982 |

* cited by examiner

Primary Examiner—Michael Barr
(74) Attorney, Agent, or Firm—Townsend and Townsend and Crew LLP

(57) ABSTRACT

The method for the manufacture of unidirectionally fiber reinforced thermoplastic bands comprises a pressure impregnation of a fiber strand in a bath with a dispersion of thermoplastic particles. Heat treatments for the drying of the strand and a melting on of the particles taken up by the strand follow the pressure impregnation. The strand is drawn through the bath at a predetermined draw-off speed about a plurality of deflection elements. The dispersion of the bath is largely held in a stationary state, namely through the supply of an infeed dispersion with a first particle concentration and through an initial setting of a second particle concentration in the bath: The infeed dispersion is fed in continuously or periodically, with the first particle concentration being held constant. A corresponding feeding in of a dispersion of higher particle concentrations as well as an additional amount of dispersing medium is possible. The second particle concentration is set to a value which remains constant through an automatic self-setting alone. In this the two named concentrations depend in an empirically determinable manner on a thermoplastic content of the band to be achieved and on the draw-off speed.

9 Claims, 2 Drawing Sheets

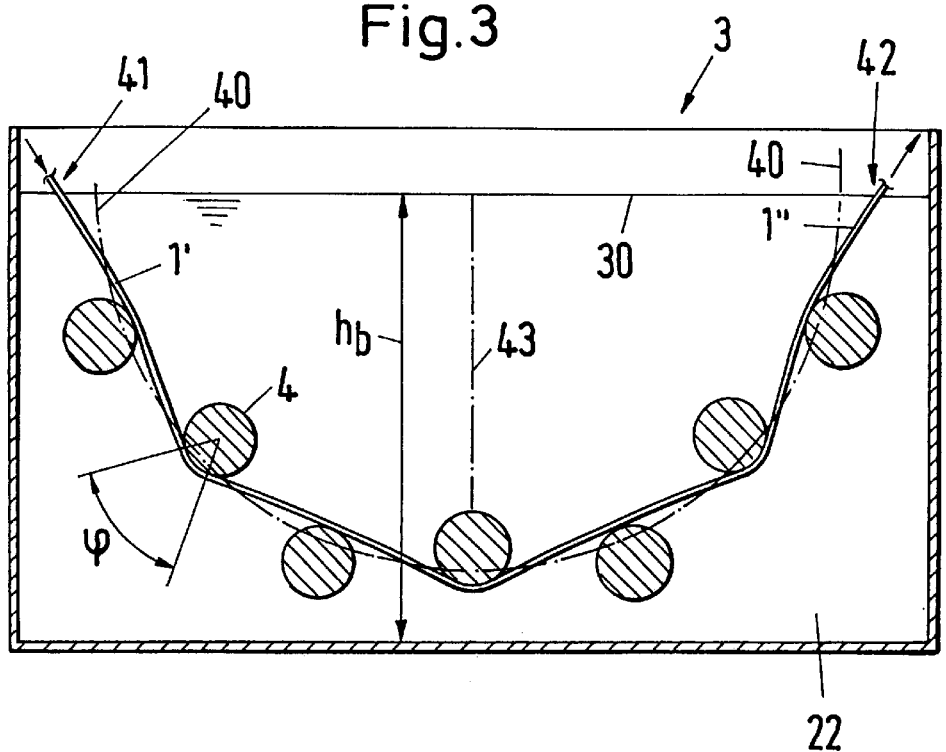
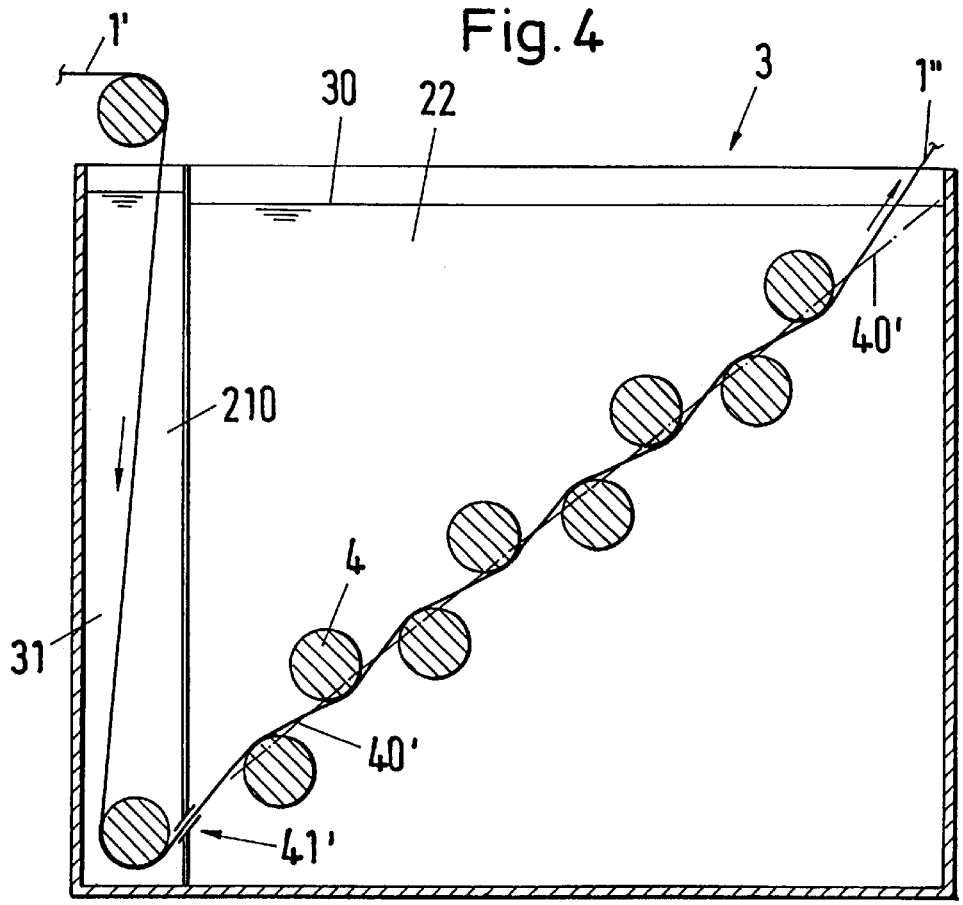

MANUFACTURE OF UNIDIRECTIONAL FIBER REINFORCED THERMOPLASTICS

BACKGROUND OF THE INVENTION

1. Field of the Invention

The invention relates to a method for the manufacture of unidirectionally fiber reinforced thermoplastics and to apparatuses for carrying out the method.

2. Description of the Prior Art

DE-A 41 21 915 describes a method for impregnating an endless reinforcement fiber strand in a bath which contains a dispersion of thermoplastic particles. In order to obtain an unchanging thermoplastic content in the bath produced, the width of the emerging strand is measured after it leaves the impregnation bath and the measured values thereby obtained are used for the regulation of the particle concentration in the bath. It is proposed to carry out this regulation through the addition of two or more dispersions and thus, for example, to use three dispersions with different concentrations, of which the middle one is set to the expectation value of the concentration in the emerging strand. In this the supply quantities of the dispersions can be set through a level regulation of the bath.

SUMMARY OF THE INVENTION

The object of the invention is to further simplify the known method. The simplification is based on it being possible to dispense with a regulation. In this a new recognition is used as the starting point, that a stationary operating state can be set intentionally, namely as a result of the fact that at a constant draw-off speed and at a constant supply of the fed in dispersion, a certain bath concentration sets itself automatically. By means of suitable prior experiments, the correct operating parameters can be determined in order to obtain a desired thermoplastic proportion in the manufacturing bath.

The method for the manufacture of unidirectionally fiber reinforced thermoplastic bands comprises a pressure impregnation of a fiber strand in a bath with a dispersion of thermoplastic particles. Heat treatments for the drying of the strand and a melting on of the particles taken up by the strand follow the pressure impregnation. The strand is drawn through the bath at a predetermined draw-off speed about a plurality of deflection elements. The dispersion of the bath is largely held in a stationary state, namely through the supply of an infeed dispersion with a first particle concentration and through an initial setting of a second particle concentration in the bath: The infeed dispersion is supplied continuously or periodically, with the first particle concentration being held constant. A corresponding feeding in of a dispersion of higher particle concentration as well as an additional amount of dispersing medium is also possible. The second particle concentration is set to a value which remains constant as a result of an automatic self setting alone. In this, the two named concentrations are dependent in an empirically determinable manner on a thermoplastic content of the band to be achieved and on the draw-off speed.

A further new recognition is given by the discovery that there is a definite draw-off speed at which the particle concentration of the infeed dispersion and that of the bath are of equal magnitude. At the draw-off speed with which this equality is associated, the method in accordance with the invention can be carried out in a particularly simple manner.

In the named laying open print DE-A 41 21 915, data on the chemical and physical properties of the usable thermoplastics, reinforcement fibers and dispersing media are provided. These data, which are considered to be applicable, will not be repeated here.

BRIEF DESCRIPTION OF THE DRAWINGS

FIG. 3 is a longitudinal section through a first impregnation bath and FIG. 4 is a corresponding section through a second impregnation bath.

DETAILED DESCRIPTION OF THE PREFERRED EXEMPLARY EMBODIMENT

Figure 1:
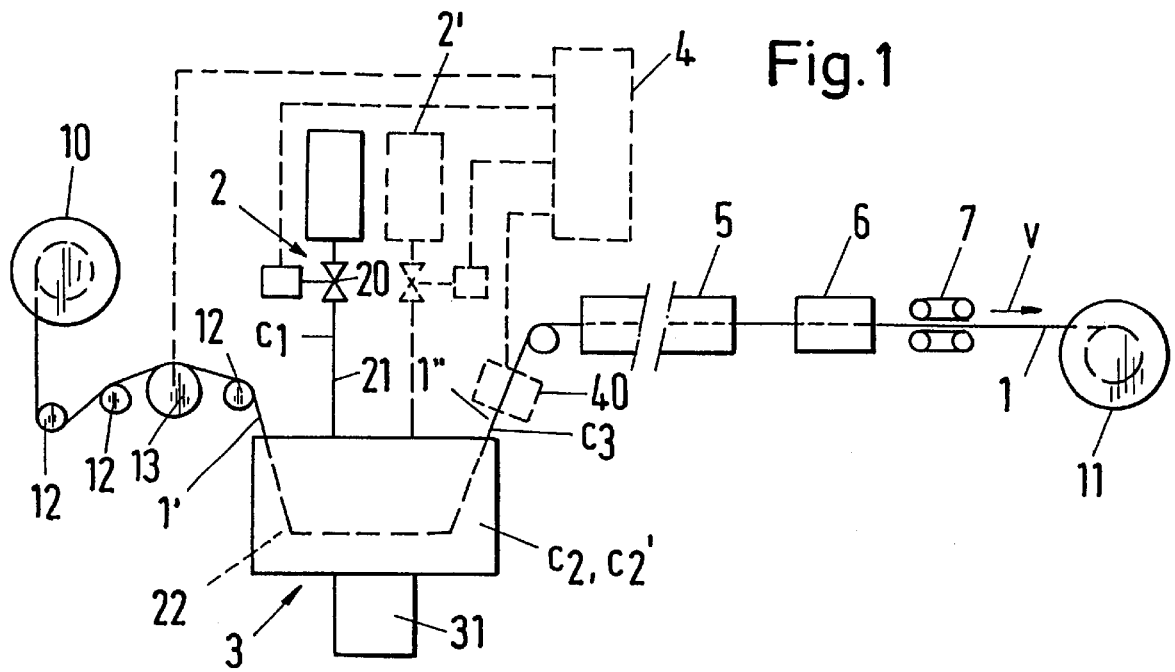
FIG. 1 is a plant by means of which the method in accordance with the invention can be carried out.

The plant shown schematically in FIG. 1 comprises the following constituents: a thermoplastic band 1 manufactured from a fiber strand 1'; a metering apparatus 2 with an adjustable valve 20 for the dispensation of an infeed dispersion 21 (particle concentration $c_1$) into an impregnation bath 3 which contains a dispersion 22 (particle concentration $c_2$); a drying oven 5 for the impregnated band 1"; a melting oven 6 for the melting on of the particles; a draw-off apparatus 7 by means of which the band 1 is drawn off with a speed v; further a winding-on reel 11 and a supply reel 10, deflection pins 12 and a mixing member 31 for the homogenization of the bath dispersion 22. Components which have been omitted with respect to the prior art (DE-A 41 21 915, see also A. M. Vordermayer et al. Composites Manufacturing Vol. 4, p 123, 1993) are illustrated in broken lines: a regulation device 4, an apparatus 40 for the optical width measurement of the pre-impregnated strand 1" and a further metering apparatus. 2' for a particle dispersion. A force pickup 13 for the measurement of a bias force can also be present in the plant in accordance with the invention.

The fiber strand 1' is drawn through in the bath 3 with the draw-off speed v and impregnated with thermoplastic particles of the dispersion 22 under the action of a tool. The tool comprises a plurality of deflection elements 4 (cf. FIG. 3) at which a pressure impregnation takes place in each case in the range of a winding angle. The fiber strand 1' consists of a plurality of layers of fibers lying one above the other. At the deflection elements, the fibers, which lie on the deflection surface experience a lower tension in the strand direction than those lying further outwardly. The outwardly lying, tauter fibers are drawn in between the inwardly lying ones, through which a spreading of the band transverse to the strand direction results. Particles which are enclosed at the surface of the strand 1' between it and the deflection surface are pressed between the less taut fibers, through which an additional spreading of the band is effected. After this take-up phase at the deflection element, the strand 1' again enters into the free dispersion 22, where its surfaces are again loaded with particles under the action of diffusion and adsorption forces. A pressing in of particles on the other side of the strand 1' takes place at the following deflection element.

The liquid phase of the bath dispersion, the dispersing medium, is e.g. water or an alcohol with a low viscosity on the order of magnitude of 0.01 Pa s. A low viscosity of the dispersing medium is advantageous in the pressure impregnation since this phase offers little resistance to the particles penetrating into the fiber strand 1'.

The particles accumulate in the strand 1' so that after emerging from the bath a particle concentration $c_3$ is present in the pre-impregnated strand 1" which is as a rule greater than $c_2$. This concentration $c_3$ is dependent on $c_2$, but also on v: $c_3 = f(c_2, v)$.

In the drying oven 5 the dispersing medium is removed from the pre-impregnated strand 1" by evaporation. The particles remaining behind in this yield a thermoplastic content θ of the band 1 which is proportional to $c_3$: $\theta = k\, c_3$. In a stationary state of the impregnation process, $c_1 = C_3$ and thus the thermoplastic content θ ($= k\, c_1$) is determined by the particle concentration $c_1$ of the infeed dispersion 21.

In accordance with the invention, the pressure impregnation is carried out in a stationary state of the bath 3, with $c_2$ being set in such a manner that this concentration depends on a thermoplastic content θ to be achieved in the band 1 and on the draw-off speed v in an empirically determinable manner ($\theta = k\, f(c_2, v)$, see above). In order that a stationary state is present, in addition to the conditions v=const. and $c_1$=const., the condition that the height of the bath level, i.e. the bath height $h_b$, remains constant must also apply, which is achieved though a correspondingly metered infeed amount of the infeed dispersion.

Figure 2A:
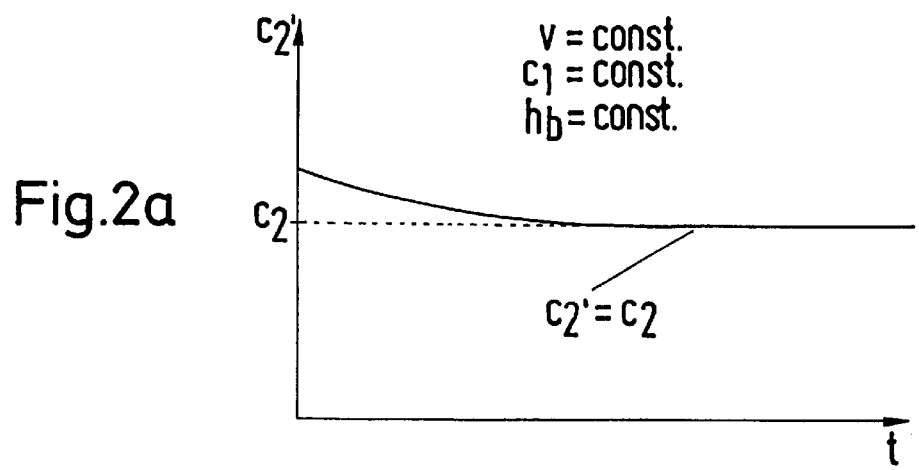
FIGS. 2a and 2b are graphs for the explanation of the self setting of the bath concentration.
Figure 2B:
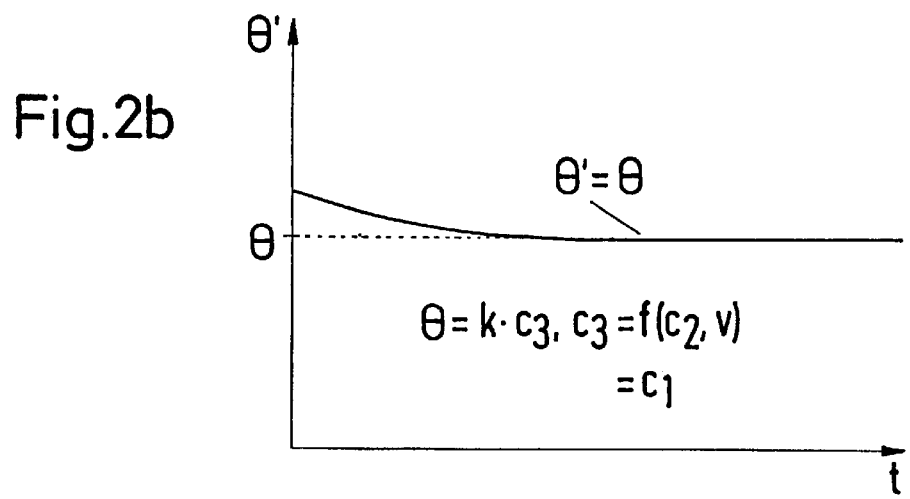

The particle concentration $c_2$ of the bath 3 need not be set exactly at the beginning of the process since the stationary value sets itself automatically afterwards. Admittedly, with such a deviation a corresponding deviation of the resulting thermoplastic content θ must be tolerated at the beginning, which, however, normally leads to no problems in practice. The self setting of the bath concentration and the corresponding behavior of the thermoplastic content is qualitatively illustrated with reference to FIGS. 2a and 2b, in which $c_2'$ designates the time dependent bath concentration and θ' the corresponding time dependent thermoplastic content.

In order to be able to keep the bath 3 in a stationary state, the supply of infeed dispersion 21 must take place continuously. It is, however, sufficient as a rule if the stationary state is only approximately present. Therefore, a periodic supply of equal amounts of the infeed dispersion 21 in each case is possible.

As can be experimentally demonstrated, there is a draw-off speed v for the stationary state at which $c_1$ and $c_2$ are equal. Since the bath dispersion 22 must occasionally be discharged from the bath 3, for example, when changing the supply reel 10, the method is better arranged if equal concentrations can be provided for both dispersions 21 and 22.

The empirical relationship between θ, v and $c_2$ mentioned is possibly known only approximately. For this reason, it can occur that the volume of the bath content does not remain constant. This volume is therefore advantageously monitored in that, in particular, the height $h_b$ (see FIG. 3) of the bath level 30 is measured. For a correction, if required, the draw-off speed v can be changed correspondingly and/or the proportion of the liquid phase of the infeed dispersion 21, that is of the dispersing medium, can be correspondingly changed, with it, however, being necessary at the same time to hold the number of thermoplastic particles fed in per unit time constant.

The pressure impregnation can be carried out with largely equal intensity at both sides of the fiber strand in that direction changes are effected by deflection elements at both sides of the strand which are alternatingly oriented and largely of equal size. The deflection elements advantageously have a largely constant radius of curvature in each case in the region of the wrapping angle as well as in the direction of motion of the strand. The deflection elements should be arranged in such a manner that the sums of the wrapping angles are largely of equal size on both sides of the strand in each case.

FIG. 3 shows a tool with deflection elements 4 which are arranged along a circular arc 40 and in each case at distances of the deflection surfaces from the circular arc 40 which are largely of equal size. Since the wrapping angle φ is greater in the deflection elements 4 of which the midpoints are located within the circular arc than for the outwardly lying ones, it is advantageous if the number of the outer elements 4 is greater by one than the number of the inner ones. The odd number of deflection elements 4 is arranged with mirror symmetry about the vertical centerline 41.

Instead of the circular arc 40 a straight line 40' can also be provided, with an equal number of deflection elements 4 advantageously being arranged on both sides of the straight line 40': see FIG. 4. Whereas in the embodiment with the circular arc 40 the point 41 for feeding the strand 1' into the bath 3 as well as the point 42 for leading the strand 1" out of the bath 3 are arranged above the bath level 30, this is no longer possible in the embodiment with deflection elements 4 arranged along the straight line. The point 41' for feeding the strand 1' into the bath 3 is therefore located below the bath level 30, with this infeed point 41' being formed as part of a lock 31. A dispersing medium 210 is provided in the lock 31 as a blocking medium; with the latter it is prevented that particles from the dispersion 22 enter into the lock chamber 31. A gas, in particular air, can also be used as a blocking medium in a differently designed lock. In the use of a dispersing medium 210 as a blocking medium, the former is fed in via an additional infeed point (not shown) into the lock 31, with a small excess pressure with respect to the bath dispersion 22 being provided; the infeed dispersion 21 is fed in with a correspondingly higher particle concentration of the bath dispersion 22.

What is claimed is:

1. A method for the manufacture of unidirectionally fiber reinforced thermoplastic bands through pressure impregnation of a fiber strand, the method comprising:

dispersing thermoplastic particles in a bath;

drawing the fiber strand through the dispersion of the bath at a predetermined draw-off speed about a plurality of deflection elements for impregnating the strands with dispersed particles;

drawing the strand out of the bath;

drying the strand through subsequent heat treatments; and melting the particles, which are taken up during the impregnation, on the strand;

wherein the dispersion of the bath is substantially held in a chemically stationary state through a continuous or periodic supply of an in-feed dispersion that has a first particle concentration that is held constant;

wherein the dispersion of the bath is further substantially held in a chemically stationary state through an initial setting of a second particle concentration in the bath to a value that remains constant due only to a second particle concentration's automatic self-setting, which causes the second particle concentration to tend toward, and reach, an empirically determined stable stationary value without the use of controlling means when the draw-off speed, in-feed dispersion concentration and height of the bath level are all held constant;

wherein the first and second concentrations depend in an empirically determinable manner on a thermoplastic content of the band to be achieved and on the draw-off speed; and wherein a particular value is set for the draw-off speed that is dependent upon the thermoplastic particle content of the band to be achieved and predetermined in such a manner that the first and second particle concentrations are approximately the same.

2. A method in accordance with claim 1 wherein a volume of the bath content that is to be held constant is monitored, and wherein if a correction is necessary, the draw-off speed is correspondingly changed.

3. A method in accordance with claim 2 wherein the volume of the bath content that is monitored is the height of the bath level, which is measured.

4. A method in accordance with claim 1 wherein a volume of the bath content that is to be held constant is monitored, and wherein, if a correction is necessary, the proportion of the liquid phase of the infeed dispersion is correspondingly changed, with the amount of thermoplastic particles being fed in per unit time being held constant at the same time.

5. A method in accordance with claim 4 wherein the volume of the bath content that is monitored is the height of the bath level, which is measured.

6. A method in accordance with claim 1 wherein the pressure impregnation is carried out at both sides of the fiber strand with substantially equal intensity, and wherein changes of direction of travel of the fiber strand that are alternatingly oriented and are substantially of equal size are effected on both sides of the strand by means of the deflection elements.

7. A method in accordance with claim 6 wherein the deflection elements have a substantially constant radius of curvature in the range of a wrapping angle and in the direction of movement of the strand, and wherein the sums of the wrapping angles on the two strand sides are substantially equal in size, with the deflection surfaces of the deflection elements being arranged along one of a straight line or a circular arc and at distances from the straight line or the circular arc respectively which are substantially of equal size.

8. A method in accordance with claim 1 wherein the liquid phase of the bath dispersion has a viscosity of substantially 0.01 Pa s.

9. A method for the manufacture of unidirectionally fiber reinforced thermoplastic bands through pressure impregnation of a fiber strand, the method comprising:

dispersing thermoplastic particles in a bath to a first particle concentration;

drawing the fiber strand through the dispersion of the bath at a predetermined draw-off speed about a plurality of deflection elements for impregnating the strands dispersed particles;

drawing the strand out of the bath;

drawing the strand through subsequent heat treatments; and melting the particles, which are taken up during the impregnation, on the strand;

wherein the dispersion of the bath is substantially held in a chemically stationary state through a corresponding supply of a dispersion of higher particle concentrations with respect to the first particle concentration and an additional amount of dispersing medium;

wherein the dispersion of the bath is further substantially held in a chemically stationary state through an initial setting of a second particle concentration in the bath to a value that remains constant due only to the second particle concentration's automatic self-setting, which causes the second particle concentration to tend toward, and reach, an empirically determined stable stationary value without the use of controlling means, when the draw-off speed, in-feed dispersion particle concentration and height of the bath level are all held constant;

wherein the first and second concentrations depend in an empirically determinable manner on a thermoplastic content of the band to be achieved and on the draw-off speed; and wherein a particular value is set for the draw-off speed that is dependent upon the thermoplastic content of the band to be achieved and predetermined in such a manner that the first and second particle concentrations are approximately the same.

* * * * *